(12) United States Patent
Ishizeki et al.

(10) Patent No.: US 6,251,524 B1
(45) Date of Patent: Jun. 26, 2001

(54) COLORED FILM, COLORED FILM-ATTACHED GLASS PRODUCT AND PROCESS FOR PRODUCING THE PRODUCT

(75) Inventors: Kenji Ishizeki; Yasuhiro Sanada; Satoshi Takeda; Akira Hirano, all of Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/408,123

(22) Filed: Sep. 29, 1999

(30) Foreign Application Priority Data

Sep. 30, 1998 (JP) .................................................. 10-277692
Sep. 30, 1998 (JP) .................................................. 10-277693

(51) Int. Cl.⁷ ............................... B32B 15/00; C09D 1/00
(52) U.S. Cl. ........................ 428/434; 428/323; 428/332; 428/428; 428/432; 106/286.7; 427/383.1; 427/383.3; 427/383.5
(58) Field of Search ..................................... 428/426, 428, 428/434, 432, 433, 323, 332, 450; 106/286.7, 286.5, 286.8; 427/383.1, 383.3, 383.5, 397.7

(56) References Cited

U.S. PATENT DOCUMENTS

| | | | |
|---|---|---|---|
| 3,660,137 | * 5/1972 | Furuuchi et al. | 117/33.3 |
| 5,731,075 | * 3/1998 | Goto et al. | 428/323 |
| 5,942,331 | * 8/1999 | Miyauchi et al. | 428/428 |
| 5,976,678 | * 11/1999 | Kawazu et al. | 428/208 |
| 6,120,850 | * 9/2000 | Kawazu et al. | 427/384 |

FOREIGN PATENT DOCUMENTS

| | | |
|---|---|---|
| 195 45 043 | 5/1998 | (DE) . |
| 0 648 715 | 4/1995 | (EP) . |
| 9-268027 | 10/1997 | (JP) . |
| 9-268029 | 10/1997 | (JP) . |
| 10-25131 | 1/1998 | (JP) . |
| 10-139494 | 5/1998 | (JP) . |
| 10-194790 | 7/1998 | (JP) . |
| 10-218608 | 8/1998 | (JP) . |
| 10-229907 | 9/1998 | (JP) . |
| 10-231145 | 9/1998 | (JP) . |
| 11-54053 | 2/1999 | (JP) . |
| 11-116279 | 4/1999 | (JP) . |
| WO98/41481 | * 9/1998 | (WO) . |

* cited by examiner

Primary Examiner—Deborah Jones
Assistant Examiner—Stephen Stein
(74) Attorney, Agent, or Firm—Oblon, Spivak, McClelland, Maier & Neustadt, P.C.

(57) ABSTRACT

A colored film comprising gold, bismuth oxide and an oxide other than bismuth oxide.

10 Claims, 1 Drawing Sheet

COLORED FILM, COLORED FILM-ATTACHED GLASS PRODUCT AND PROCESS FOR PRODUCING THE PRODUCT

BACKGROUND OF THE INVENTION

1. Field of the Invention

The present invention relates to a colored film, a colored film-attached glass product and a process for producing the product. Particularly, it relates to a colored film which provides an excellent ornamental property and protection of privacy and is suitable for various glass surfaces for automobiles, buildings, etc., a glass product provided with such a colored film, and a process for producing such a product.

2. Description of the Background

Many methods have been proposed to impart various functions by forming metal oxide coating films on substrates. Methods for forming coating films which are commonly used at present, include, for example, a dry method such as vacuum deposition, sputtering or CVD, and a wet method such as a sol-gel method or a spray thermal decomposition method. Among them, formation of a metal oxide film by a wet method is industrially advantageous, since film formation can be carried out at a low cost. When a glass surface is coated with a thin film of a transition metal oxide, the glass will be colored variously due to the ion absorption. Further, as a characteristic of the light absorptive oxide, the reflectance will be increased to present a half mirror state, whereby the ornamental property of the glass will be improved.

As a method for forming a metal oxide coating film by a wet method, a method has heretofore been known in which a liquid prepared by a so-called sol-gel method, containing a metal alkoxide as the main material, is coated. However, in the case of a sol-gel method using a metal alkoxide as the main material, the color which can be developed, is limited, and it has been difficult to obtain a film which exhibits a desired color clearly, and there has been another problem that the film is not practically useful from the viewpoint of chemical resistance or abrasion resistance.

On the other hand, a method has been proposed in which a metal salt and a silicon alkoxide or the like are mixed, followed by film forming by a sol-gel method (e.g. J. Non-Crystalline Solids 82 (1986) 378–390). However, such a method has had a problem that if a silicon alkoxide or the like other than the coloring component is added to such an extent that the resulting coating film will have adequate durability, the absorbance decreases, and the desired colored film can not be obtained, and further it tends to be difficult to obtain a clear color.

On the other hand, a demand has recently increased for a variety of colors for colored films, and uniformly colored films having not only a conventional gray or bronze color but also a primary color such as red, blue or green, or an intermediate color such as purple or pink have now been demanded. Here, the conventional methods have had a problem that the colors which can be developed, are rather limited, and it is difficult to satisfy the demand for various clear colors.

As methods for developing such various colors, JP-A-9-235141, JP-A-9-295834 and JP-A-10-877343 propose methods of forming colored films by means of a gold colloid. However, the colors of colored films obtained by these methods were a dark blue color or a bluish green color, and it was impossible to obtain a colored film having a clear blue color.

Further, JP-A-9-301743 proposes a method of forming a colored film having a clear blue color by means of a gold colloid. However, this method requires a double layer structure, and thus has had a problem that coating solutions have to be coated twice, thus leading to an increase of costs.

In view of the above problems, it is an object of the present invention to provide a colored film which presents a clear blue, green, bronze or gray color and which is excellent also in abrasion resistance and chemical resistance, by a single coating step, which can not be accomplished by the conventional wet methods, and a colored film-attached glass product and a process for producing such a product.

SUMMARY OF THE INVENTION

That is, the present invention provides a colored film comprising gold, bismuth oxide and an oxide other than bismuth oxide.

Further, the present invention provides a colored film-attached glass product comprising a glass substrate and the above colored film formed on the glass substrate.

Still further, the present invention provides a process for producing a colored film-attached glass product, which comprises coating on a glass substrate a coating solution containing a precursor for gold which can be converted to gold by reduction by heat treatment, a precursor for bismuth oxide which can be converted to bismuth oxide by heat treatment, and a precursor for an oxide which can be converted to an oxide other than bismuth oxide by heat treatment, followed by heat treatment.

BRIEF DESCRIPTION OF THE DRAWINGS

In the accompanying drawing.

DETAILED DESCRIPTION OF THE INVENTION

Figure 1:
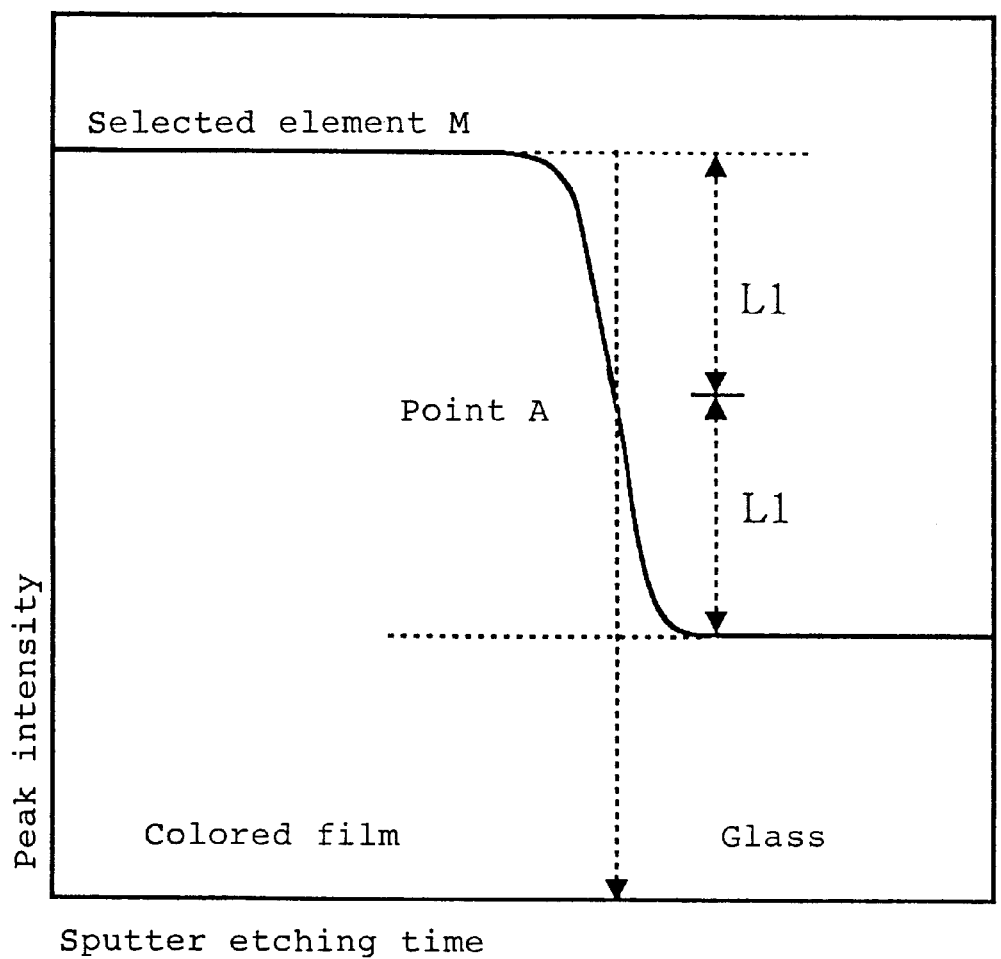
FIG. 1 is a graph illustrating the method for measuring the thickness of the colored film.

Now, the present invention will be described in detail with reference to the preferred embodiments.

The colored film of the present invention is obtained by coating on a substrate a coating solution for forming a colored film, which contains a compound of a noble metal including gold (in the present invention, gold, palladium and platinum are represented by the noble metal, and silver is not included), a compound of bismuth and a compound of an element other than bismuth, drying it as the case requires, followed by baking at a temperature of at least 200° C. for at least 5 minutes.

In the present invention, the noble metal is present in the formed colored film in the form of noble metal colloidal particles (hereinafter referred to as noble metal colloid). Bismuth oxide and an oxide other than bismuth oxide are present as the main components (matrix) of the colored film, to disperse the noble metal colloid in a stabilized state and, a desired transmission color is developed by plasmon resonance absorption by the noble metal colloid.

Here, the composition of components constituting the colored film will be described in further detail.

If present in the form of gold colloid in the matrix, gold absorbs light with a wavelength of 500 to 680 nm, accompanied by changes in the refractive index of the matrix or in the particle size of the gold colloid due to the colloid resonance absorption and thus develops a transmission color of orange, red, purple or blue. For this purpose, gold is an essential component to form a colored film in the present invention.

If present in the form of palladium colloid in the matrix, palladium absorbs light of a short wavelength region within a visible light range, accompanied by changes in the refractive index of the matrix or in the particle size of palladium colloid, due to the colloid resonance absorption and thus develops a transmission color of brown. When used in combination with gold colloid, it develops a color of bronze together with the gold colloid. Therefore, palladium is an essential component to develop a bronze color in the present invention.

If present in the form of platinum colloid in the matrix, platinum absorbs light of a short wavelength region within a visible light range, accompanied by changes in the refractive index of the matrix or in the particle size of the platinum colloid due to the colloid resonance absorption and thus develops a transmission color of brown. When used in combination with gold colloid, it develops a gray color together with the gold colloid. Therefore, platinum is an essential component to develop a gray color in the present invention.

The total amount of noble metals is preferably more than 0 and at most 20 atomic %, based on the entire elements constituting the colored film (hereinafter, the same definition will be employed for the content of a noble metal). If it exceeds 20 atomic %, bonding of other components tends to be impaired, whereby durability of the film tends to be poor. Further, the noble metal colloid will precipitate on the film surface, whereby the film tends to have a poor surface smoothness, and it will be impossible to obtain a film having practical durability. Further, aggregation of the noble metal colloid is likely to take place, whereby it tends to be difficult to obtain a film having high transparency with little haze. More preferably, the total amount of noble metals is from 0.2 to 5 atomic %.

In order to obtain a transmission color of bronze by using absorption of gold colloid and palladium colloid, it is preferred that palladium is contained in the colored film in an atomic ratio of from 0.1 to 1 (at least 0.1 and at most 1), particularly from 0.1 to 0.5, relative to gold.

Further, in order to obtain a transmission color of gray by using absorption of gold colloid and platinum colloid, it is preferred that platinum is contained in the colored film in an atomic ratio of from 0.1 to 1, particularly from 0.1 to 0.5, relative to gold.

The content of bismuth is preferably more than 0 and at most 10 atomic %, based on the entire elements constituting the colored film (hereinafter, the same definition will be employed for the content of bismuth). Bismuth is present in the form of bismuth oxide in the colored film and is an essential component to provide a gloss to the colored film and to develop a clear transmission color. Further, if the content of bismuth exceeds 10 atomic %, the refractive index of the film tends to be too high, and the reflectance will increase, such being undesirable. More preferably, the content of bismuth is from 0.2 to 3 atomic %.

Silicon which is used as an element of the oxide other than bismuth oxide, will be present in the form of silicon oxide in the film, and it is preferably incorporated, since it serves to fix noble metal colloid and as a low refractive index component to prevent increase of the reflectance of the film. If the content of silicon is too low, the strength of the film decreases. The content of silicon is preferably such that the number of silicon atoms is from 10 to 30 atomic %, based on the entire elements constituting the colored film (hereinafter, the same definition will be employed for the content of silicon). More preferably, the content of silicon is from 15 to 25 atomic %.

Titanium which is used as an element of the oxide other than bismuth oxide will be present in the form of titanium oxide in the film, and it may be incorporated to fix noble metal colloid and to adjust the refractive index of the colored film to obtain a film having an optional transmission color. The content of titanium is preferably such that the number of titanium atoms is from 2 to 15 atomic %, based on the entire elements constituting the colored film (hereinafter, the same definition will be employed for the content of titanium). If the content is less than 2 atomic %, the refractive index of the film will be too low, and it will be impossible to attain development of a clear blue color by gold colloid. On the other hand, if it exceeds 15 atomic %, the refractive index of the film will be too high, and it will be impossible to attain development of a clear blue color by gold colloid. More preferably, the content of titanium is from 4 to 10 atomic %.

If present in the form of silver colloid, silver absorbs light with a wavelength of from 350 to 500 nm, accompanied by a change in the particle size of the silver colloid and develops a transmission color of yellow. In order for the silver to develop a transmission color of green together with absorption by gold colloid, gold is preferably from 0.1 to 10 times by eight, more preferably from 0.4 to 2.5 times by weight, most preferably from 0.5 to 2 times by weight, relative to the silver.

Each of gold and silver may be present in the colored film. However, if silver colloid is present in the colored film, it is thermodynamically instable, and tends to migrate to the colored film surface by irradiation with ultraviolet rays, etc., and tends to be oxidized for color fading. Therefore, it is preferred that all or most of silver is contained in a glass substrate wherein it can be present in a stabilized state. Namely, in a colored film-attached glass product of the present invention, it is preferred that silver fine particles are present in the vicinity of the surface of the glass substrate on which the colored film is formed.

The thickness of the colored film of the present invention is not particularly limited, but it is necessary to control the thickness depending upon the particular purpose, since the thickness is closely related to the visible light transmittance $T_{va}$ or the transmission color. In the case of a single layer film (solely of the colored film), the thickness is preferably from 100 to 400 nm. If it is less than 100 nm, fine particles of a noble metal such as gold tend to precipitate on the surface of the colored film, and such fine particles are likely to fall off by abrasion or the like. If it exceeds 400 nm, the abrasion strength tends to be low, and the reflection color tends to be strong. Accordingly, a thicker film may be formed in a case where high abrasion strength is not required, and the reflective index and the reflection color will not be problematic. In a case where the film is used at a movable portion such as a side light, i.e. a side window glass (especially a front side light) of an automobile, higher abrasion strength is required, and the film thickness is preferably at most 250 nm.

When the colored film-attached glass product of the present invention is to be used for buildings or automobiles, a clear blue, green, bronze or gray color is desired as a colored glass. Accordingly, a glass of blue color preferably has transmission colors $T_x$ and $T_y$ being from 0.250 to 0.290 and from 0.270 to 0.310, respectively, a glass of green color preferably has transmission colors $T_x$ and $T_y$ being from 0.260 to 0.300 and from 0.320 to 0.360, respectively, a glass of bronze color preferably has transmission colors $T_x$ and $T_y$ being from 0.330 to 0.350 and from 0.345 to 0.365, respectively, and a glass of gray color preferably has transmission colors $T_x$ and $T_y$ being from 0.295 to 0.320 and from 0.300 to 0.325, respectively, by a CIE chromaticity diagram as prescribed in JIS Z8792, as measured with illuminant C at 20°.

Further, in recent years, glass for automobiles is required to have an ultraviolet ray shielding function or an infrared ray shielding function as well as an ornamental property. From the practical viewpoint, the above-mentioned colored film-attached glass product preferably has an ultraviolet transmittance ($T_{uv}$) of at most 12%, more preferably at most 7%, as prescribed in ISO-9050. The solar radiation transmittance ($T_e$) is preferably at most 50%, particularly preferably at most 30%, as prescribed in JIS R3106.

The colored film of the present invention can be used also as a shade band for a windshield or a back light (rear window glass) of an automobile. To obtain a sunlight-shielding effect, the visible light transmittance ($T_{va}$) is preferably at most 40%, particularly preferably at most 30%, as prescribed in JIS R3106.

Further, when it is used as a glass for an automobile, if the reflection of the glass surface is high, a glaring impression is given to the user, whereby the high grade impression may sometimes be impaired. Accordingly, the glass surface reflectance ($R_{va}$) is preferably at most 10%, particularly preferably at most 8%, as prescribed in JIS R3106.

Glass as the substrate may, for example, be transparent colorless glass, colored glass containing a coloring component, or ultraviolet ray and heat ray-absorbing green glass which contains a coloring component and which has a high ultraviolet ray absorbing function and heat ray absorbing function.

In the present invention, a gold material as a gold colloid source (a precursor for gold which will be converted to gold by reduction by thermal treatment) is not particularly limited so long as it is soluble in an organic solvent. However, chloroauric acid which is usually readily available, is preferred. Also preferred is an organic compound such as an alkyl mercaptide of gold or gold balsam.

To the precursor for gold which can be converted to gold by reduction by heat treatment, a precursor for palladium or platinum which can be converted to palladium or platinum, respectively, by reduction by heat treatment, may be added.

A preferred compound as a palladium material (the precursor for palladium) is not particularly limited so long as it is soluble in an organic solvent, but preferred is an inorganic salt such as a chloride or a nitrate, or an organic compound such as an acetate or an acetylacetone salt, which is usually readily available.

A preferred compound as a platinum material (the precursor for platinum) is not particularly limited so long as it is soluble in an organic solvent, but preferred is chloroplatinic acid which is usually readily available. Also preferred is an organic compound such as an acetylacetone salt of platinum or platinum balsam.

A preferred compound as a bismuth material (the precursor for bismuth oxide which can be converted to bismuth oxide by heat treatment) is not particularly limited so long as it is soluble in an organic solvent, but it is preferred to employ a metal soap (for example, bismuth naphthenate). The anion moiety of a metal soap effectively serves as a hardening catalyst for silicon oxide or titanium oxide and promotes hardening of the matrix of a colored film composed of silicon oxide and/or titanium oxide, whereby a colored film having high scratch resistance can be obtained, such being desirable.

The precursor for an oxide which can be converted to an oxide other than bismuth oxide by heat treatment, may, for example, be tetrabutoxysilane or tetraethoxysilane.

A preferred compound as a silver material is not particularly limited so long as it is soluble in an organic solvent, and silver nitrate, silver acetate or silver lactate, which is usually readily available, may, for example, be mentioned.

In the present invention, the solvent to be used for a coating solution for forming a colored film, is not particularly limited so long as it is capable of dissolving the starting material compound as a component for the colored film, and an organic solvent may be mentioned, such as an alcohol, a diol (such as ethylene glycol, propylene glycol or hexylene glycol), an ether alcohol (such as a cellosolve or carbitol), terpineol, cresol or phenol.

Further, a thickener may be added to adjust the liquid viscosity of the coating solution for forming the colored film. As such a thickener, a resin which is soluble in the solvent to be used in the present invention, may be employed. It may, for example, be a cellulose such as nitro cellulose, ethyl cellulose or carboxypropyl cellulose, a copolymer polyamide resin, an acryl resin, a polyethylene glycol, a polyvinyl resin or a polyether. The amount to be added is adjusted depending upon the coating method for the coating film, and is not particularly limited.

The above coating solution for forming a colored film, is coated on a substrate and heated (baked) at a temperature of at least 200° C. to obtain a gold colloid dispersed oxide coating film-attached glass. In a case where a silver compound is contained in the coating solution, it is possible to obtain a gold colloid-dispersed oxide coating film-attached glass having silver colloid dispersed in the glass, by heating (baking) at a temperature of at least 400° C.

Further, it is preferred that the coating film is formed on the glass bottom surface (i.e. the glass surface which was in contact with tin bath, of a glass produced by a float process). Namely, by an influence of tin remaining on the glass surface, reduction of silver is likely to take place, and formation of silver colloid takes place at a low temperature. There is no particular upper limit for the heating temperature, and heating can be carried out to a heat resistant temperature of the substrate, for example, at a level of from 650 to 700° C. in the case of a usual soda lime glass, and the higher the temperature, the more dense the coating film will be.

Further, immediately after coating the coating solution or after drying the coating layer within a temperature range of from room temperature of 200° C., ultraviolet rays may be irradiated and then baked. Irradiation with ultraviolet rays is effective for 1) accelerating the curing of the coating film, 2) adjustment of the transmission color, and 3) adjustment of the light absorbance.

The method for coating the coating solution for forming a colored film on the substrate, is not particularly limited, and various methods may be employed, such as spin coating, dip coating, spray coating, meniscus coating, flow coating, die coating, roll coating, gravure coating, flexoprinting and screen printing.

The colored film having a noble metal colloid including gold dispersed therein, of the present invention, has a structure in which such colloid is monodispersed in the matrix and thus has a poor conductive chain structure, whereby the surface resistance will be at least $10^{11}$ Ω/□, and it has a high electric wave transmittance which can be applied also to a glass provided with a glass antenna.

Now, the present invention will be described in further detail with reference to Examples. However, it should be understood that the present invention is by no means restricted to such specific Examples. Various methods for evaluation employed in the following Examples, are as follows.

1. Film Composition of the Colored Film

The film composition of the colored film was evaluated by analyses in the depth direction from the surface by means of an X-ray photoelectron spectrometry (XPS) in combination with sputter etching by an Ar ion beam. By this method, quantitative analyses are carried out with respect to the film-constituting elements i.e. O, Si, Ti, Bi, Pt and Au in the respective sputter etching times. Here, XPS peaks of the respective elements used, are an $O_{1s}$ peak, $Si_{2p}$ peak, a $Ti_{2p3/2}$ peak, a $Bi_{4f5/2}$ peak, an $Au_{4f}$ peak, a $Pt_{4f}$ peak and a $Ag_{3d}$ peak. And, the quantitative analyses were carried out in the respective sputter etching times, and from the results, the compositional ratio of components of the colored film was calculated.

The XPS spectrometer used, was Quantum 2000, manufactured by PHI Company, and Al-Kα rays of 15 kV and 20 W monochromatized by a monochromoter, were used as an X-ray source. The X-ray beam was applied perpendicularly to the sample surface, and to reduce the crater periphery effect, a fine region of 100 μm on the sample surface was measured under a condition of a beam diameter being 100 μm. Further, the detecting angle of the X-ray photoelectron was 45°, and the measurement was carried out by using a combination of an electron shower and an Ar ion beam shower for correcting electrification. Here, as the base line for the respective peaks, an integrated mode of the software built-in the apparatus was employed.

With respect to blond glass, by XPS, the Au peak and the Pd peak will overlap, and by this method, accurate calculation of the film composition is impossible. Therefore, an attention has been drawn to Bi, of which the concentration can be accurately calculated without a trouble by both fluorescent X-ray and XPS analyses in the case of a composition like the present thin film, and the respective ratios to Bi were calculated by both methods. Namely, the compositional ratio of elements Au, Pd and Bi was calculated by using a standard sample by means of a wet analysis or the above-mentioned fluorescent X-ray analysis, while the compositional ratio of Si, O, Ti and Bi was calculated by means of XPS. And, on the basis of both results, the compositional ratio of Si, O, Ti, Bi, Au and Pd was obtained.

2. Thickness of the Colored Film

The measurement of the thickness of the colored film was carried out by an analysis in the depth direction from the surface by means of an X-ray photoelectron spectrometry (XPS) in combination with sputter etching by an Ar ion beam. By this method, the sputter etching time by the Ar ion beam corresponds to the depth from the surface i.e. the film thickness. FIG. 1 is a view illustrating the method for measuring the thickness of the colored film. The thickness of the colored film was obtained by an analysis in the depth direction of any one of elements Au, Ti and Bi by the method shown in FIG. 1 (the sputter etching time at point A (the center point) in FIG. 1 where the intensity of the XPS peak of any one of elements i.e. the $Au_{4f}$ peak, the $Ti_{2p3/2}$ peak or the $Bi_{4f5/2}$ peak drops, corresponds to the film thickness of the colored film). Conversion from the sputter etching time to the film thickness was made by a calibration curve prepared by using a standard sample of the same composition having a known film thickness.

The XPS spectrometer used, was Quantum 2000, manufactured by PHI Company, and Al-Kα rays of 15 kV and 20 W monochromatized by a monochromoter, were used as an X-ray source. The X-ray beam was applied perpendicularly to the sample surface, and to reduce the crater peripheral effect, a fine region of 100 μm on the sample surface was measured under a condition of a beam diameter of 100 μm. Further, the detecting angle of the X-ray photoelectron was 45°, and the measurement was carried out by using a combination of an electron shower and an Ar ion beam shower for correcting electrification.

3. Transmission Color ($T_x$, $T_y$)
Obtained in accordance with JIS Z8729.

4. Visible Light Transmittance ($T_{va}$)
Obtained in accordance with JIS R3106.

5. Ultraviolet Ray Transmittance ($T_{uv}$)
Obtained in accordance with ISO-9050.

6. Solar Radiation Transmittance ($T_e$)
Obtained in accordance with JIS R3106.

7. Reflectance of Glass Surface ($R_{va}$)
The reflectance of the glass surface was obtained in accordance with JIS R3106.

8. Haze (H value)
Obtained in accordance with JIS K6714.

9. Abrasion Resistance

Testing machine: Tabor rotary abraser (manufactured by Kabushiki Kaisha Toyoseiki Seisakusho).

Test condition 1:
Abrading ring: H-22, load: 250 g, and number of abrasion: 500 times.

Test condition 2:
Abrading ring: H-22, load: 500 g, and number of abrasion: 500 times.

Abrasion resistance tests were carried out under the above test conditions, and the haze values after the tests were evaluated.

In Table 2, Abrasion resistance 1 and Abrasion resistance 2 indicate the results under test conditions 1 and 2, respectively.

10. Chemical resistance

A sample was immersed in a 0.1N NaOH aqueous solution for 24 hours in a constant temperature atmosphere of 25° C. The change in the visible light transmittance before and after the test was evaluated.

Reference Example 1

The following composition was employed for a coating solution (% for each component is wt %, and the same applies in the following other Reference Examples.

| | |
|---|---|
| Tetrabutoxytitanium | 9.9% |
| Tetraethoxysilane | 18.6% |
| Ethyl cellulose | 8.0% |
| α-terpineol | 42.3% |
| Alkylmercaptide gold | 2.6% |
| Bismuth naphthenate | 18.6% |

EXAMPLE 1

The above mixture was coated by screen printing on the bottom surface of a glass substrate (3.5 mm in thickness, 100 mm×100 mm, $T_{va}$: 81%, $T_{uv}$: 45%, x is 0.304 and y is 0.320 by CIE chromaticity diagram with illuminant C under a condition of 2°), and dried at 120° C. for 10 minutes, followed by baking at 650° C. for 5 minutes to obtain a colored film-attached glass product of the present invention.

The film composition and the film thickness of the obtained colored film are shown in Table 1, and $T_x$, $T_y$, $T_{va}$, $T_{uv}$, $T_e$, $R_{va}$, H-value, and test results for abrasion resistance and chemical resistance are shown in Table 2. The amounts of elements other than the elements constituting the colored film shown in Table 1, were very small and negligible.

Reference Example 2

| | |
|---|---:|
| Tetrabutoxytitanium | 9.5% |
| Tetraethoxysilane | 17.8% |
| Ethyl cellulose | 8.0% |
| α-terpineol | 43.5% |
| Alkylmercaptide gold | 2.6% |
| Palladium acetylacetone salt | 0.8% |
| Bismuth naphthenate | 17.8% |

EXAMPLE 2

The above mixture was coated by screen printing on the bottom surface of a glass substrate ( 3.5 mm in thickness, 100 mm×100 mm, $T_{va}$: 75%, $T_{uv}$: 9.5%, x is 0.321 and y is 0.327 by CIE chromaticity diagram with illuminant C under a condition of 2°) and dried at 120° C. for 10 minutes, followed by baking at 650° C. for 5 minutes to obtain a colored film-attached glass product of the present invention.

The film composition and the film thickness of the obtained colored film are shown in Table 1, and $T_x$, $T_y$, $T_{va}$, $T_{uv}$, $T_e$, $R_{va}$, H-value, and test results for abrasion resistance and chemical resistance are shown in Table 2. The amounts of elements other than the elements constituting the colored film shown in Table 1, were very small and negligible.

Reference Example 3

| | |
|---|---:|
| Tetrabutoxytitanium | 8.8% |
| Tetraethoxysilane | 19.8% |
| Ethyl cellulose | 8.0% |
| α-terpineol | 43.1% |
| Alkylmercaptide gold | 2.6% |
| Platinum balsam | 2.2% |
| Bismuth naphthenate | 15.5% |

EXAMPLE 3

The above mixture was coated by screen printing on the bottom surface of a glass plate ( 3.5 mm in thickness, 100 mm×100 mm, $T_{va}$: 75%, $T_{uv}$: 9.5%, x is 0.321 and y is 0.327 by CIE chromaticity diagram with illuminant C under a condition of 2°) and dried at 120° C. for 10 minutes, followed by baking at 650° C. for 5 minutes to obtain a colored film-attached glass product of the present invention.

The film composition and the film thickness of the obtained colored film are shown in Table 1, and $T_x$, $T_y$, $T_{va}$, $T_{uv}$, $T_e$, $R_{va}$, H-value, and test results for abrasion resistance and chemical resistance are shown in Table 2. The amounts of elements other than the elements constituting the colored film shown in Table 1, were very small and negligible.

Reference Example 4

| | |
|---|---:|
| Tetrabutoxytitanium | 13.3% |
| Tetraethoxysilane | 7.2% |
| Ethyl cellulose | 8.0% |
| α-terpineol | 56.4% |
| Alkylmercaptide gold | 2.4% |
| Silver lactate | 2.2% |
| Bismuth naphthenate | 10.5% |

EXAMPLE 4

The above mixture was coated by screen printing on the bottom surface of a glass substrate (3.5 mm in thickness, 100 mm×100 mm, $T_{va}$: 75%, $T_{uv}$: 9.5%, x is 0.321 and y is 0.327 by CIE chromaticity diagram with illuminant C under a condition of 2°) and dried at 120° C. for 10 minutes, followed by baking at 650° C. for 5 minutes to obtain a colored film-attached glass product of the present invention.

The film composition and the film thickness of the obtained colored film are shown in Table 1, and $T_x$, $T_y$, $T_{va}$, $T_{uv}$, $T_e$, $R_{va}$, H-value, and test results for abrasion resistance and chemical resistance are shown in Table 2. Further, it was confirmed that in the glass substrate, silver colloid was present. The weight ratio of Ag/Au was 0.9. Further, the amounts of elements other than the elements constituting the colored film shown in Table 1, were very small and negligible.

Reference Example 5

| | |
|---|---:|
| Tetrabutoxytitanium | 13.4% |
| Tetraethoxysilane | 23.5% |
| Ethyl cellulose | 8.0% |
| α-terpineol | 40.2% |
| Alkylmercaptide gold | 3.4% |
| Bismuth naphthenate | 11.5% |

EXAMPLE 5

The above mixture was coated by screen printing on the bottom surface of a glass substrate (3.5 mm in thickness, 100 mm×100 mm, $T_{va}$: 81%, $T_{uv}$: 45%, x is 0.304 and y is 0.320 by CIE chromaticity diagram with illuminant C under a condition of 2°) and dried at 120° C. for 10 minutes, followed by baking at 650° C. for 5 minutes to obtain a colored film-attached glass product of the present invention.

The film composition and the film thickness of the obtained colored film are shown in Table 1, and $T_x$, $T_y$, $T_{va}$, $T_{uv}$, $T_e$, $R_{va}$, H-value, and test results for abrasion resistance and chemical resistance are shown in Table 2. The amounts of elements other than the elements constituting the colored film shown in Table 1, were very small and negligible.

Reference Example 6

| | |
|---|---:|
| Tetrabutoxytitanium | 12.5% |
| Tetraethoxysilane | 28.5% |
| Ethyl cellulose | 8.0% |
| α-terpineol | 24.0% |
| Alkylmercaptide gold | 3.5% |
| Platinum balsam | 3.0% |
| Bismuth naphthenate | 20.5% |

EXAMPLE 6

The above mixture was coated by screen printing on the bottom surface of a glass substrate (3.5 mm in thickness, 100 mm×100 mm, $T_{va}$: 75%, $T_{uv}$: 9.5%, x is 0.321 and y is 0.327 by CIE chromaticity diagram with illuminant C under a condition of 2°) and dried at 120° C. for 10 minutes, followed by baking at 650° C. for 5 minutes to obtain a colored film-attached glass product of the present invention.

The film composition and the film thickness of the obtained colored film are shown in Table 1, and $T_x$, $T_y$, $T_{va}$, $T_{uv}$, $T_e$, $R_{va}$, H-value, and test results for abrasion resistance and chemical resistance are shown in Table 2. The amounts of elements other than the elements constituting the colored film shown in Table 1, were very small and negligible.

Reference Example 7

| | |
|---|---|
| Tetrabutoxytitanium | 16.5% |
| Tetraethoxysilane | 21.2% |
| Ethyl cellulose | 8.0% |
| α-terpineol | 33.4% |
| Alkylmercaptide gold | 2.6% |
| Iron octylate | 18.3% |

EXAMPLE 7

The above mixture was coated by screen printing on the bottom surface of a glass substrate (3.5 mm in thickness, 100 mm×100 mm, $T_{va}$: 81%, x is 0.304 and y is 0.320 by CIE chromaticity diagram with illuminant C under a condition of 2°) and dried at 120° C. for 10 minutes, followed by baking at 650° C. for 5 minutes to obtain a colored film-attached glass product of the present invention.

The film composition and the film thickness of the obtained colored film are shown in Table 1, and $T_x$, $T_y$, $T_{va}$, $T_{uv}$, $T_e$, $R_{va}$, H-value, and test results for abrasion resistance and chemical resistance are shown in Table 2. The amounts of elements other than the elements constituting the colored film shown in Table 1, were very small and negligible.

TABLE 1

| Example No. | Film composition of the colored film (atomic ratio) | Film thickness of the colored film (nm) |
|---|---|---|
| 1 | Au/Si/Ti/Bi/0 = 1.1/23.3/5.0/1.0/69.6 | 240 |
| 2 | Au/Si/Ti/Bi/Pd/0 = 0.9/20.5/8.4/0.9/0.2/69.1 | 220 |
| 3 | Au/Si/Ti/Bi/Pt/0 = 0.6/23.2/4.2/0.6/0.2/71.2 | 210 |
| 4 | Au/Si/Ti/Bi/0 = 1.7/17.0/8.5/1.7/71.1 | 192 |
| 5 | Au/Si/Ti/Bi/0 = 0.9/24.3/4.7/1.2/28.9 | 330 |
| 6 | Au/Si/Ti/Bi/Pt/0 = 0.5/24.8/8.7/0.7/0.2/65.1 | 340 |
| 7 | Au/Si/Ti/Fe/0 = 2.1/23.2/8.0/3.0/63.7 | 230 |

TABLE 2

| Example No. | Color | $T_{va}$ (%) | $T_x$ | $T_y$ | $T_{uv}$ (%) | $T_e$ (%) | $R_{va}$ (%) | H-value (%) | Abrasion resistance 1 | Abrasion resistance 2 | Chemical resistance |
|---|---|---|---|---|---|---|---|---|---|---|---|
| 1 | Clear blue | 24.4 | 0.268 | 0.279 | 4.5 | 17.7 | 5.3 | 0.3 | 3.5 | 4.5 | 0.2 |
| 2 | Bronze | 29.0 | 0.340 | 0.355 | 3.4 | 15.3 | 4.8 | 0.4 | 4.3 | 5.0 | 0.3 |
| 3 | Gray | 25.2 | 0.308 | 0.320 | 3.3 | 14.3 | 4.6 | 0.2 | 3.9 | 4.6 | 0.1 |
| 4 | Green | 26.5 | 0.268 | 0.342 | 4.5 | 21.6 | 6.8 | 0.2 | 2.6 | 3.8 | 0.1 |
| 5 | Clear blue | 29.0 | 0.270 | 0.295 | 4.1 | 16.5 | 7.3 | 0.5 | 4.7 | 13.5 | 0.4 |
| 6 | Gray | 26.0 | 0.295 | 0.310 | 3.5 | 16.3 | 7.8 | 0.4 | 4.6 | 12.5 | 0.5 |
| 7 | Bluish green | 26.3 | 0.258 | 0.310 | 3.5 | 16.8 | 5.1 | 0.3 | Peeled | Peeled | 2.8 |

With respect to samples of Examples 1 to 6, the surface resistance values of the coating films were measured, and in each case, the surface resistance was at least $10^{12}$ Ω/□, and thus, they showed no electrical conductivity and had excellent electric wave transmitting properties.

According to the present invention, it is possible to provide a colored film which exhibits a color of clear blue, bronze, green or gray by a single coating which used to be impossible to accomplish by a conventional wet method and which is excellent also in abrasion resistance and chemical resistance.

What is claimed is:

1. A colored film comprising gold, bismuth oxide, silicon oxide and titanium oxide, wherein the contents of silicon oxide and titanium oxide are from 10 to 30 atomic %, as silicon atoms, and from 2 to 15 atomic %, as titanium atoms, respectively, based on the entire elements constituting the colored film.

2. The colored film according to claim 1, which further contains at least one noble metal selected from the group consisting of palladium and platinum.

3. The colored film according to claim 2, wherein the total amount of gold, palladium and platinum is more than 0 and at most 20 atomic %, based on the entire elements constituting the colored film.

4. The colored film according to claim 1, wherein the content of bismuth oxide is more than 0 and at most 10 atomic %, as bismuth atoms, based on the entire elements constituting the colored film.

5. The colored film according to claim 1, wherein the film thickness is from 100 to 400 nm.

6. A colored film-attached glass product comprising a glass substrate and a colored film as defined in claim 1, formed on the substrate.

7. The colored film-attached glass product according to claim 6, wherein fine silver particles are present in the glass substrate on which the colored film is formed.

8. The colored film according to claim 4, wherein the content of bismuth oxide is from 0.2 to 3 atomic %, as bismuth atoms, based on the entire elements constituting the colored film.

9. The colored film according to claim 1, wherein the content of titanium oxide is from 4 to 10 atomic %, as titanium atoms, based on the entire elements constituting the colored film.

10. A process for producing a colored film-attached glass product, which comprises coating on a glass substrate, a coating solution containing a precursor for gold which can be can converted to gold by reduction by heat treatment, a precursor for bismuth oxide which can be converted to bismuth oxide by heat treatment, and a precursor for an oxide which can be converted to an oxide other than bismuth oxide by heat treatment, followed by heat treatment, wherein the oxide other than bismuth oxide comprises silicon oxide and titanium oxide, and wherein the contents of the silicon oxide and the titanium oxide are from 10 to 30 atomic % as silicon atoms and from 2 to 15 atomic % as titanium atoms, respectively, based on the entire elements constituting the colored film.

* * * * *